United States Patent [19]

Magnusson

[11] Patent Number: 4,846,646

[45] Date of Patent: Jul. 11, 1989

[54] APPARATUS FOR CONNECTING THE ATTACHMENT PART OF A TEAR-OFF SECTION OF A SEALING CAP WITH A PULLING MEMBER

[75] Inventor: Swen-Ake Magnusson, Kungalv, Sweden

[73] Assignee: Wicanders Kapsyl AB, Alvangen, Sweden

[21] Appl. No.: 102,139

[22] Filed: Sep. 29, 1987

[30] Foreign Application Priority Data

Apr. 30, 1987 [SE] Sweden ............................. 8701809

[51] Int. Cl.$^4$ ............................................. B29C 45/14
[52] U.S. Cl. ...................... 425/121; 264/163; 264/268; 264/215; 425/127; 425/553; 425/554; 425/556; 425/576
[58] Field of Search ............... 425/117, 121, 123, 124, 425/127, 128, 129 R, 544, 553, 554, 556, 557, 561, 576; 264/163, 268, 274, 275

[56] References Cited

U.S. PATENT DOCUMENTS

| 4,274,822 | 6/1981 | Tamai et al. | 264/268 |
| 4,611,983 | 9/1986 | Bielfeldt | 425/544 |
| 4,715,806 | 12/1987 | Ehrler et al. | 425/556 |

FOREIGN PATENT DOCUMENTS 1039555  6/1955  France ............................. 425/576

Primary Examiner—Jay H. Woo
Assistant Examiner—Timothy W. Heitbrink
Attorney, Agent, or Firm—Brumbaugh, Graves, Donohue & Raymond

[57] ABSTRACT

An apparatus for connecting a tear-off section of a sealing cap with a pulling member including positioning means for orienting the sealing cap relative to the mould parts with the attachment part enclosed within the mould cavity and a chamber to receive a quantity of plastic material and communicating with the mould cavity via passages so that when the mould parts close the plastic will flow from the chamber into the mould cavity and envelop the attachment part.

10 Claims, 3 Drawing Sheets

APPARATUS FOR CONNECTING THE ATTACHMENT PART OF A TEAR-OFF SECTION OF A SEALING CAP WITH A PULLING MEMBER

BACKGROUND OF THE INVENTION

This invention relates to a method of and apparatus for connecting the attachment part of a tear-off section of a sealing cap and a pulling member for removing the tear-off section. A sealing cap of this type is described in my copending application Ser. No. 119,103, filed Nov. 10, 1987.

Tear-off sealing caps in various forms have enjoyed considerable commercial success, primarily due to the ease with which the consumer can remove the cap from a bottle without having to use a special bottle opener. One typical version of tear-off sealing cap is provided with a pulling member in the form of a metal ring which is secured to an attachment part or tongue on the tear-off section. In this version, the attachment part is connected to the metal ring by being rolled into or around a ring using a special tool. This method of attachment is relatively complicated and is carried out using expensive machinery which is subject to considerable wear. Furthermore, it is difficult to achieve the desired high and uniform strength in the connection between attachment part and the ring.

The choice of material used in prior art sealing caps is also limited by the prior art methods. Steel, which has a tendency to rust, has been the principal and most practical material. Tear-off sealing caps of other materials, such as aluminum, have been manufactured by punching blanks from sheet material, but such techniques are inefficient because they waste considerably more material than sealing caps made according to the invention.

When manufacturing the pulling member by conventional techniques, it is difficult to make it sufficiently thick and of a convenient shape for gripping, since the materials available and the ways of shaping it are limited. Conventional tear-off sealing caps also entail risk of injury when opening the cap, particularly cuts caused by sharp edges if the cap is opened incorrectly.

SUMMARY OF THE INVENTION

The object of the invention is to alleviate the above drawbacks by providing an improved method and apparatus for attaching the pulling member to the tear-off sealing portion of the cap.

This object is achieved in the present invention by a method and apparatus which includes orienting the sealing cap relative to two mould parts which close to form a mould cavity, the attachment part being enclosed in the mould cavity when the mould parts are closed, introducing a quantity of plastic material between the mould parts before they are closed so that the plastic material fills the mould cavity and comes into contact with the attachment part of the tear-off section of the sealing cap, cooling the mould parts so that the plastic material solidifies firmly joined to the attachment part, and thereafter opening the mould parts and removing the moulded connection.

DESCRIPTION OF THE DRAWINGS

The invention is described herein by way of example with reference to the accompanying drawings in which.

DESCRIPTION OF THE PREFERRED EMBODIMENTS

Figure 1:
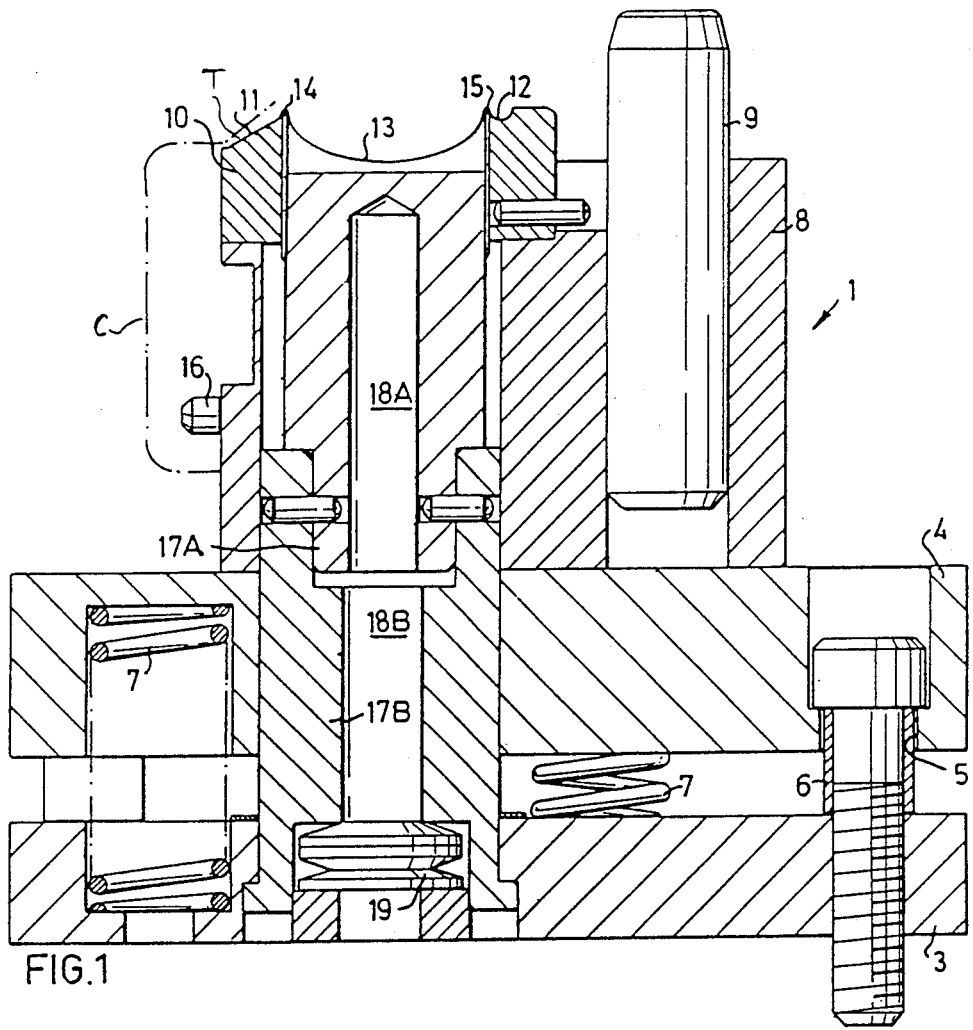
FIG. 1 is a section through the lower part of a moulding apparatus embodying the invention.
Figure 2:
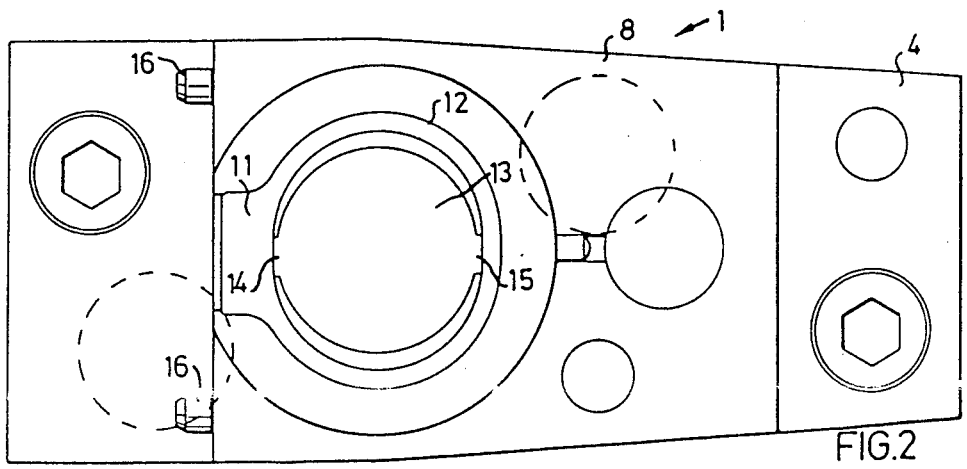
FIG. 2 is a plan view of the moulding apparatus shown in FIG. 1.
Figure 3:
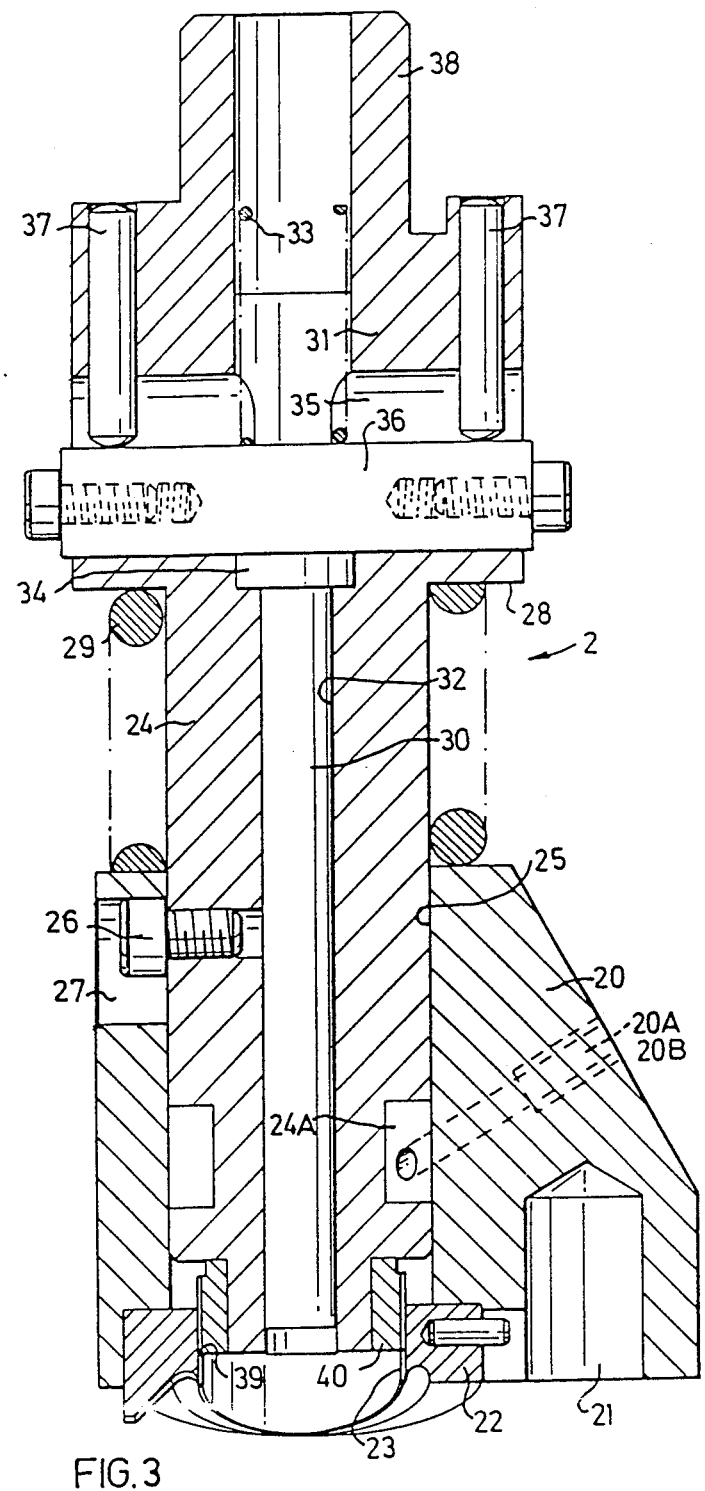
FIG. 3 is a section through the upper part of the moulding apparatus.

Referring to FIGS. 1, 2 and 3, a moulding apparatus according to the invention includes a lower mould part 1 and an upper mould part 2. The lower mould part includes a bottom plate 3 secured to a base, preferably a rotating platform shown in FIG. 4. Located vertically above the bottom plate 3 is a moveable plate 4 provided with guide holes 5 accommodating the upper ends of guide dowels 6 mounted on the bottom plate 3. Between the bottom plate 3 and the movable plate 4 are a number of springs 7 exerting upward forces on the plate 4. A block 8, accommodating a lower mould 10 and provided with a vertically protruding guide pin 9, is arranged on the movable plate 4. The block 8 has two orientation guides 16 serving to position a sealing cap C and an attachment part or tongue T shown is broken lines in FIG. 1.

The lower mould half 10 has a lower cavity area 11 for the attachment part or tongue T of the sealing cap, a lower mould cavity 12 in the shape of the pulling member, and a central chamber 13 to receive a suitable quantity of plastic material. Passages 14, 15 are provided to connect the plastic receiving chamber 13 with the mould cavities 11, 12. In the embodiment shown, the mould cavity is shaped to produce a ring-shaped pulling member.

The lower mould half 10, the block 8 and the plates 3 and 4 are provided with coaxial holes which accommodate a movable plunger made up of connected parts 17A and 17B. The upper surface of the plunger forms the bottom of the central chamber 13. Cup springs 19 are provided in the bottom plate 3 beneath the plunger. The plunger 17A, 17B can move vertically downwards against the action of the cup springs 19. The plunger is provided with a cavity 18A, 18B for the insertion of a heating means (not shown).

The upper mould part 2, shown in FIG. 3, includes a guide block 20 having a guide hole 21 in the base which receives the upper end of the pin 9. An upper mould half 22 mounted in the bottom of the guide block 20 and has a central opening 23 for receiving the lower end of a piston 24. The piston 24 is guided for movement within a vertical hole 25 within the guide block 20. To limit the range of movement of the piston 24, it carries a stop in the form of a screw 26, which protrudes into a vertical slot 27 in the guide block 20. The upper end of the piston 24 has a flange 31 with a lower horizontal shoulder 28. Between this shoulder 28 and an upper surface of the guide block 20 a compression spring 29 is arranged around the piston 24. This spring urges the piston 24 upwardly relative to the guide block 20.

The piston 24 has an elongate central aperture 32 which accommodates a spring-urged plunger 30 for vertical movement. This plunger 30 is pressed in downward direction by a compression spring 33 retained by a plug (not shown) in the upper end of the piston 24. The plunger 30 has a shoulder 34 which engages the piston 24 to limit the downward movement of the plunger 30 relative to the piston 24.

The flange 31 is provided with a horizontal opening 35 for receiving a yoke 36 therein. The vertical height of the yoke is less than that of the opening 35. The lower surface of the yoke 36 is in contact with the upper surface of the plunger 30.

Two guidepins 37 in the flange 31 engage the upper surface of the yoke 36. These pins are flush with the upper surface of the flange 31 when the yoke 36 is in its lowermost position. In all other positions of the yoke, the pins will protrude above the upper surface of the flange 31.

The upper free end 38 of the piston 24 is influenced by cam-control means journalled in a holder (not shown). The upper ends of the guidepins 37 are also influenced by overhead cam-control means.

The lower end of the piston 24 is provided with one or more cutting edges 39 located opposite the passages 14, 15 on the lower mould half. The cutting edges 39 are carried on a ring 40 mounted on the lower end of the piston. An annular channel 24A for coolant is provided in the lower part of the piston 24. Coolant is conducted to and from the channel via conduits 20A, 20B through the guide block 20.

Figure 4:
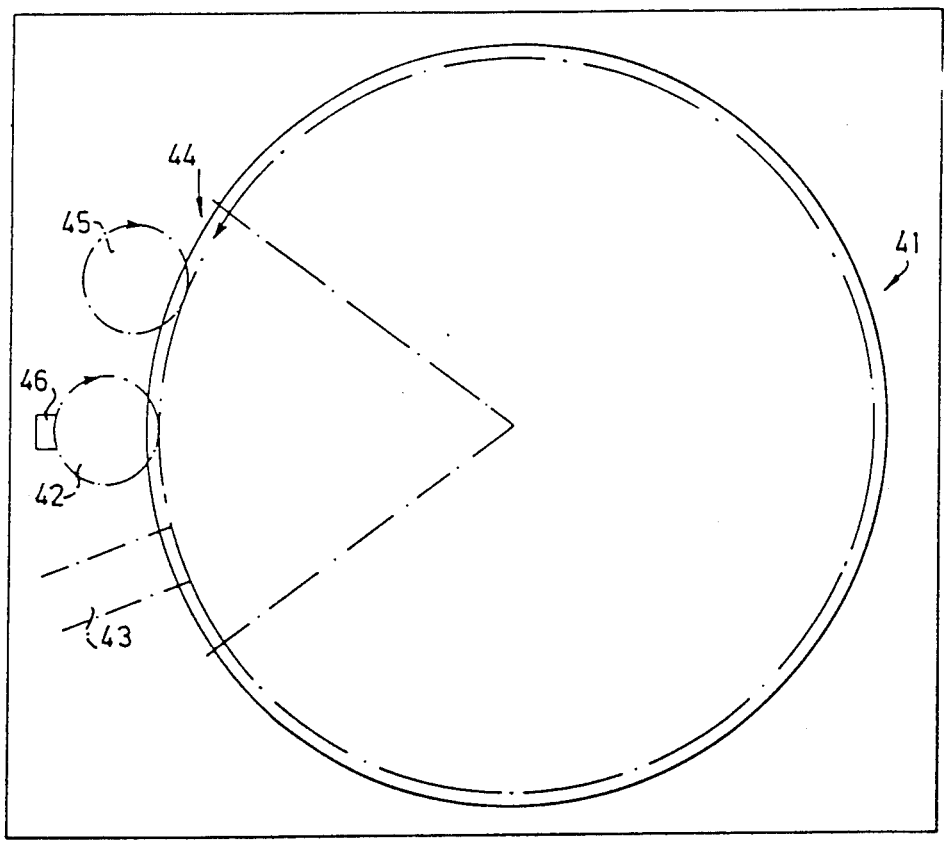
FIG. 4 is a schematic plan view of a rotating platform for carrying the moulding apparatus through a plurality of stations.

The moulding apparatus of the present invention is carried on a revolving platform 41, shown schematically in FIG. 4. A plurality of moulding apparatus is arranged on the revolving platform 41 with the cam-control means located above.

Referring to FIG. 4, the sealing caps are supplied at a feed-in station from a feeding wheel 42 on which they are oriented as they are transferred from a supply channel 46. The sealing caps are transferred from the wheel 42 to the positioning means 16 of the lower mould part. Before the sealing cap is delivered to the moulding apparatus, the attachment part is prepared, for example, by providing it with holes, slits, impressions or varnish, or a combination thereof, to reinforce the connection with the pulling member. The preparation of the attachment part or tongue can be carried out while transported on the feeding wheel from the channel to the moulding apparatus.

With the mould parts in open position and the sealing cap oriented such that the attachment part is located in the cavity area 11, the platform transports the mould parts to a station 43 where a specific quantity of plastic material is introduced in molten form or in solid form as a bead into the central chamber 13. As the moulding apparatus is transported away from the station 43, the piston 24 will be actuated by the cam-control means to close the mould parts and to compress the plastic material between the plungers 17 and 24, causing the plastic to flow from the chamber 13 into the mould cavities 11 and 12, thus enveloping the attachment part and forming the pulling member.

The mould parts are then cooled while the cam-control means keeps the mould parts closed. When the plastic material has solidified in the mould, waste material is trimmed away in a trimming zone 44. The mould parts are then opened, and the sealing cap and pulling member are removed at a feed-out station by a wheel 45. The waste material is then ejected from the mould parts and collected for re-use.

Turning now to a more detailed description of the operation of the moulding apparatus, the mould parts are open in the feed-in station where the sealing cap with the attachment part in the form of a tongue is positioned by the feed-in wheel to stand on edge with the tongue directed obliquely upwards. As it is transferred, the sealing cap is oriented by the positioning guides 16 so that the tongue fits into the cavity area 11 of the lower mould part. The plastic material is then introduced in solid or liquid form in the central chamber 13.

As the platform transports the moulding apparatus, the cam-control means will engage the upper end 38 of the piston 24, forcing it and the guide block 20 downwardly guided by the pin 9 toward the lower mould part so that the mould parts come into contact with each other to form a closed mould cavities 11, 12. If desired, the attachment part of the sealing cap and the moulding surfaces can be pre-heated in a suitable manner, for example, by induction heating.

As the upper mould part 2 continues its downward movement, the lower mould part 1, including the block 8 and the vertically movable plate 4, are displaced downwardly compressing the springs 7. The relative positions between the plunger 24 and the guide block 20 remain substantially constant since the springs 7 have much greater yield than the spring 29. The bottom of the central chamber 13 (i.e., the upper end of the plunger 17A) remains stationary during this movement, but its position relative to the lower mould 10 is altered so that the bottom will be located just adjacent the passages 14 and 15 when the movable plate 4 reaches the bottom plate 3. Due to this relative movement, the plastic material is forced out through the passages 14 and 15 into the mould cavities 11, 12. Some of the plastic material will also fill the space between the bottom of the piston 24 and the upper mould 22.

As the piston 24 is pressed further down, the spring 29 will be compressed to a limited extent and the piston 24 will move downwardly in relation to the upper mould 22. The plastic material is thus subjected to further pressure and more plastic is forced through the passages 14 and 15 to the mould cavity. When the mould cavity is full, the excess material will increase the pressure and the plunger 30 will be forced upwardly against the force of the spring 33 and plastic will be pressed into the lower end of the central hole 32. As the plunger 30 moves up, it will displace the yoke 36, which in turn will raise the guide pins 37 so that they will protrude above the upper surface of the flange 31. Alternatively, the lower end of the central hole 32 may be filled at the same time as the mould cavity, and the excess material will remain as a thickish plate between plunger 17A and piston 24. In this case, the pressure in the plastic compound is determined by the cup springs 19, acting through the plunger 17A, 17B.

The downward movement of the piston 24 is then discontinued and it remains stationary during the cooling procedure. Cooling may be achieved by circulating coolant or by the use of cooling elements (not shown). After cooling, when the plastic material has solidified, the piston 24 is displaced downwardly briefly an additional increment by the cam-control means, pushing the plunger 17A, 17B against the cup springs 19 so that the cutting edges 39 of the ring 40 cut the deadhead to the mould cavity 12. The piston 24 is then lifted and the mould parts are opened. The plastic plug formed in the lower part of the hole 32 accompanies the piston 24 on its upward journey, together with the rest of the excess material. The central hole 32 may be provided with ridges or the like to encourage adhesion of the plastic plug. When the mould parts are almost fully open, the moulded pulling member with the attached cap is removed by the feed-out wheel 45 at the feed-out station.

In the travel between feed-out and feed-in station, the mould parts are fully opened, and the guide pins 37 will be pushed downwardly as they come into contact with the lower part of the holder for the cam-control means. The pins 37 will, therefore, force the yoke 36 downwardly and this, in turn, will push down the plunger 30, ejecting the plastic plug from the central hole 32. The waste is collected in a channel and re-used.

The method and apparatus of the present invention provides a finished cap which requires no further trimming or processing.

The invention is shown and described in preferred form and by way of example, and many variations and modifications are possible within the scope of the invention. For example, the compression space for the receipt of the excess plastic material could be located outside the mould cavity. Moreover, a separate expansion chamber would not be required if the deadhead is arranged radially outside the mould cavity. Any waste material present in the reception chamber 13 will then be ejected before fresh plastic material is supplied. Cooling and heating can be achieved in various ways, and both upper and lower mould parts can be provided with means for the supply and removal of heat. Also, pneumatic or hydraulic actuation could be used in place of overhead.

In the embodiment shown and described herein, the pulling member is moulded in the form of a ring at the same time and of the same plastic material as the attachment part of the sealing cap. However, the pulling member could be made of some other material, such as metal, and then joined to the attachment part, in which case the mould would be provided with receiving and positioning means for the pulling member which, in turn, would be separately fed to the moulding apparatus. Alternatively, the pulling member could be joined to the attachment part in a later operation, in which case the invention would be utilized only to provide the attachment part of the sealing cap with plastic connection.

The specific embodiments described herein are intended to be illustrative, and many modifications and variations are possible within the scope of the claims.

I claim:

1. An apparatus for moulding a plastic pulling member onto and in attached relation to an attachment part of a tear-off section of a previously formed separate sealing cap comprising moulding means having two mould parts which close to form a mould cavity for the pulling member, means for orienting the sealing cap outside the mould cavity and relative to the mouding means with the attachment part being enclosed in the mould cavity when the mould parts are closed, a chamber to receive a discrete quantity of plastic material and communicating with the mould cavity to flow the plastic material from the chamber to the mould cavity when the mould parts are closed, the mould cavity forming a plastic connection which envelops the attachment part, means for pressing the plastic material in the chamber to cause it to flow into the mould cavity and means for separating excess plastic material in the chamber from the plastic material in the mould before opening the mould.

2. An apparatus as set forth in claim 1 in which the chamber is defined intermediate the moulding parts when the mould parts are closed and including passages between the chamber and the mould cavity for the flow of the plastic material from the chamber to the mould cavity.

3. An apparatus as set forth in claim 1, wherein the mould cavity has the shape of both the connection and the pulling member to mould both simultaneously.

4. An apparatus as set forth in claim 1, including a space in one of the moulding parts and communicating with the chamber to receive excess material.

5. An apparatus as set forth in claim 4 in which the space taking up excess material is defined by at least one movable wall to provide a variable space.

6. An apparatus as set forth in claim 5, wherein said movable wall is defined by the end surface of a spring-loaded plunger.

7. An apparatus as set forth in claim 4, including ejection means to eject the excess material taken up within said space.

8. An apparatus as set forth in claim 1, wherein the chamber for receiving the plastic material is located within a lower mould part, and including passages within said lower mould part for connecting the chamber to the mould cavity.

9. An apparatus as set forth in claim 4, wherein the space for taking up excess material is located in an upper mould part and in communication with the chamber.

10. An apparatus as set forth in claim 1, in which the pressing means includes a resiliently backed plunger in both mould parts defining opposite walls of the chamber, a resiliently backed ejecting plunger accommodated within one of the plungers to receive excess plastic material from the chamber when the mould cavity is full and means for actuating the ejecting plunger to eject the excess plastic material.

* * * * *